Oct. 2, 1956
P. BUTTERFIELD
2,765,181
BALANCED VALVED SELF-SEALING COUPLING
Filed Jan. 14, 1952
2 Sheets-Sheet 1
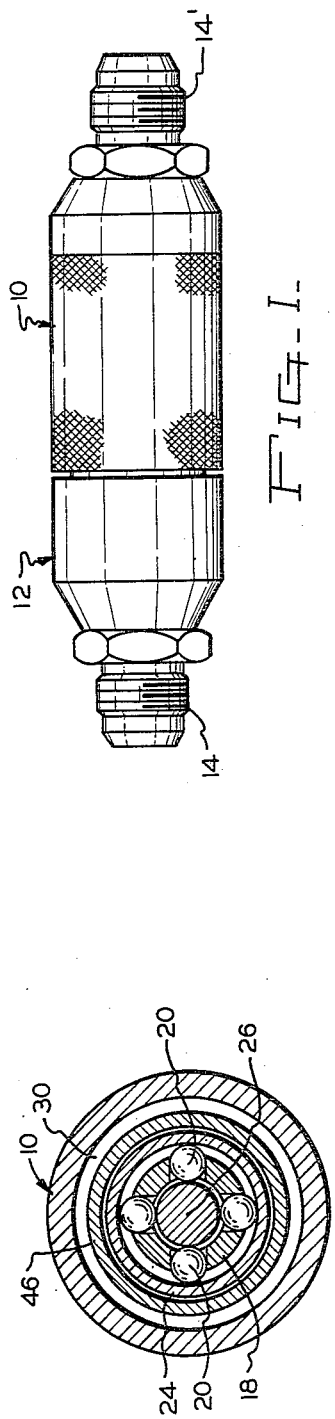
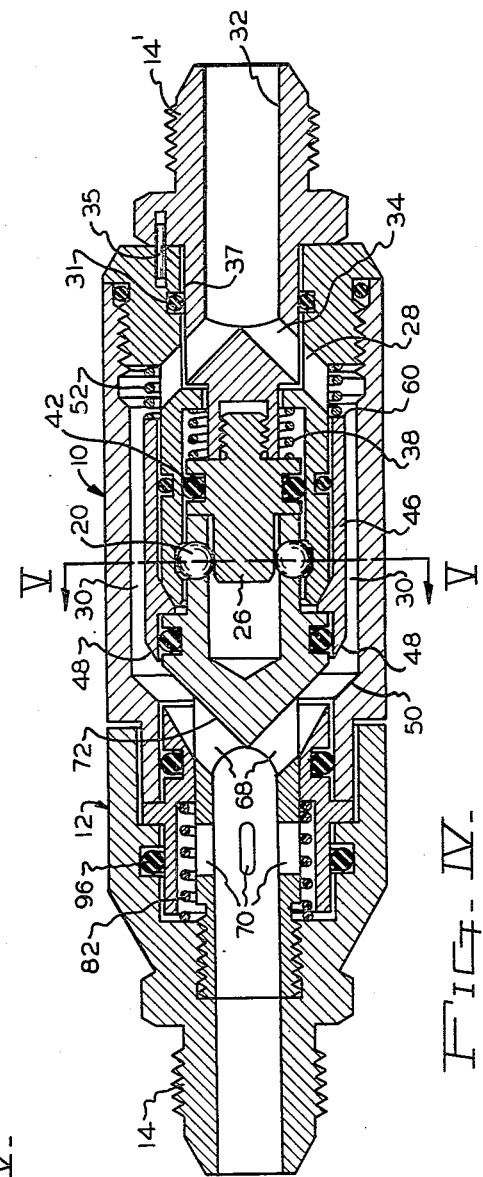
INVENTOR
PETER BUTTERFIELD
BY
ATTORNEY

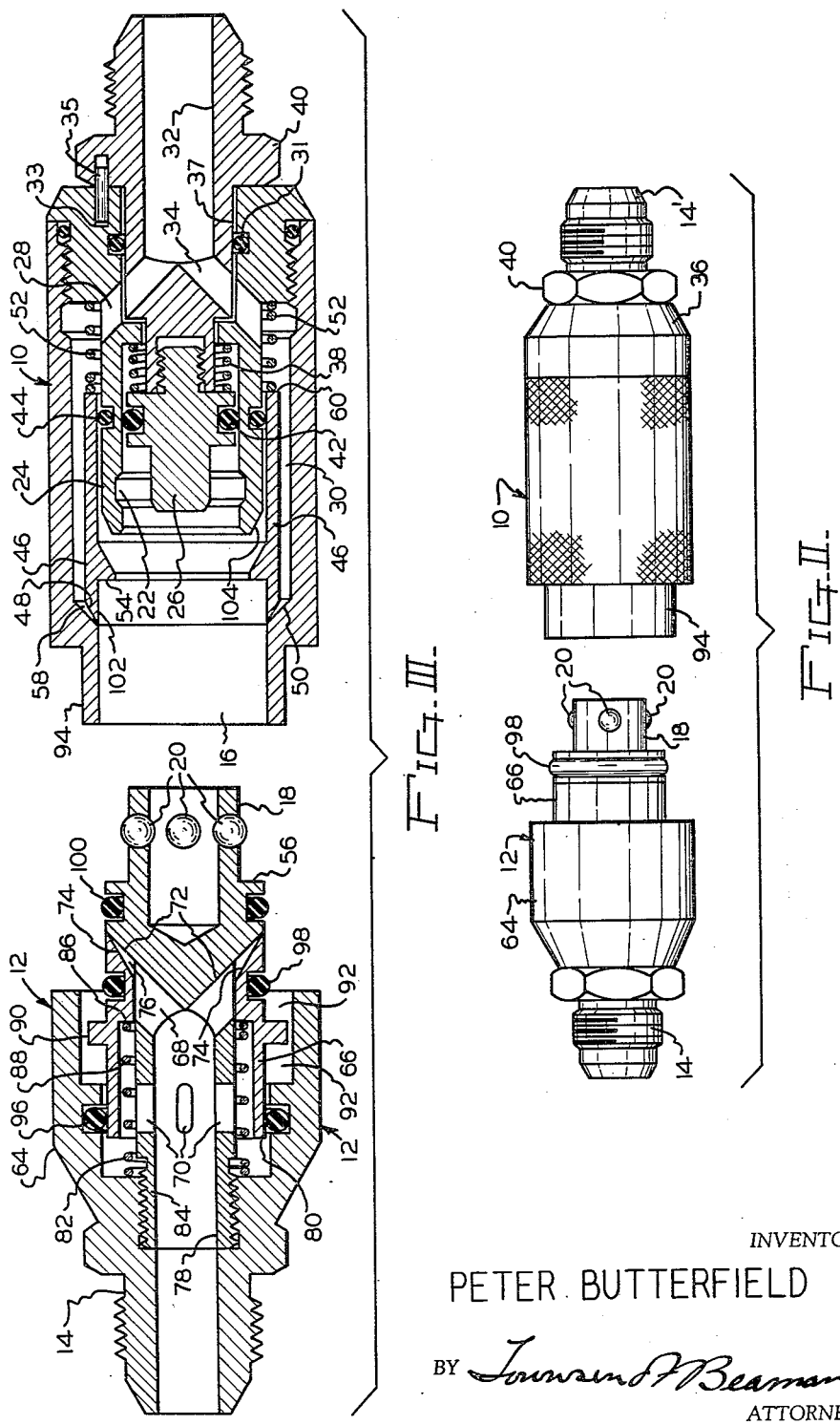

United States Patent Office 2,765,181
Patented Oct. 2, 1956

2,765,181

BALANCED VALVED SELF-SEALING COUPLING

Peter Butterfield, Jackson, Mich., assignor to Aeroquip Corporation, Jackson, Mich., a corporation of Michigan Application January 14, 1952, Serial No. 266,365

1 Claim. (Cl. 284—18)

This invention relates to valve constructions for controlling the flow of high pressure fluid and more particularly to fluid conductor couplings of the kind which comprise a pair of hollow body parts adapted to be connected together and to be disconnected, and housing spring loaded self-sealing valves which are opened upon connection of the body parts but which close automatically upon disconnection of the body parts so as to seal their respective body parts against loss of fluid. In connection with these self-sealing couplings and their use to conduct high pressure fluid difficulty is encountered in connecting the coupling body parts together due to the fact that not only is it necessary to open the valves against their spring loading but the internal fluid pressure also has to be overcome.

It is an object of the invention to provide an improved coupling of the above kind in which the connection of the coupling body parts is capable of being effected with the application of greatly reduced manual effort compared with the connection of the known coupling constructions which require that both the valve springs and the internal fluid pressure have to be overcome in order to connect the coupling parts together and open the valves.

It is thus an important object of this invention to provide a coupling of the above kind in which the valves are in substantial fluid balance so that it is merely necessary to overcome the valve springs when connecting the coupling body parts together.

A further object of the invention is to provide a valve assembly for controlling the flow of high pressure fluid in which the movable valve member is in substantial fluid pressure balance when closed.

The above and further objects and advantages of the invention will become clear from a consideration of the following detail description of one practical form of the invention with reference to the accompanying drawings and from the appended claim.

In the drawings:

Fig. I is a side elevational view of a coupling in accordance with the invention, with the coupling body parts connected, Fig. II is a similar view to Fig. I, but showing the body parts disconnected, Fig. III is a longitudinal sectional view of the disconnected coupling body parts as seen in Fig. II, Fig. IV is a longitudinal sectional view showing the coupling body parts connected together, and Fig. V is a cross section on the line V—V of Fig. IV.

In the drawings 10 indicates a female coupling body part and 12 a male coupling body part, both parts being of tubular construction, as shown, and each having an end nipple attachment 14, 14' by which the body parts can be secured upon the ends of their respective fluid conductors, usually in the form of flexible hose.

The female body part 10 presents a socket opening 16 at one end into which a tube extension 18 on the male body part 12 is capable of being introduced axially to couple the two body parts together by the locking engagement of balls 20 in an annular recess 22 defined within the female body part 10 between a tube and plug assembly 24 and 26, respectively.

The tube 24 extends co-axially within the body part 10 and has a series of ports 28 providing communication for fluid flow between an outer annular chamber 30 and the bore 32 of the end nipple 14' via ports 34 in said nipple. The body part 10 is mounted for limited axial sliding motion upon the nipple portion 37 against the action of coil spring 38 which normally maintains the end wall 36 of the body part 10 against a flange 40 on the nipple 14'. Such axial sliding movement of the body part 10 takes place upon the body part 10 being grasped to connect the coupling body parts and permits the balls 20 to engage in said annular recess 22. An axially extending pin 35 on the nipple part 14' and engaged in axial bore 33 in the end wall 36 serves properly to locate the body part 10 and nipple 14' when these two parts are displaced axially relative to each other. An O ring 31 serves to maintain a fluid seal between the body part 10 and the nipple portion 37.

The plug 26 is shown separately formed and secured to the nipple part 14' by screw-threading. The plug 26 carries an O sealing ring 42 for maintaining a fluid seal with respect to the interior of the tube 24, which tube also carries an O sealing ring 44 for sealing against the interior surface of an axially slidable valve sleeve 46.

The valve sleeve 46 is slidable upon the tube 24 and has a conical end surface 48 for seating against a conical valve seat 50 on the interior of the body part 10, adjacent its socket opening 16. The valve sleeve 46 is normally urged to closed position against the seat 50 by the action of a coil spring 52. On its interior surface the valve sleeve 46 is provided with an inwardly directed radial flange 54 presenting an abutment surface for engagement by an outwardly directed radial flange 56 on the tube extension 18 on the other coupling body part 12. It is to be noted that the conicity of the valve surfaces 48 and 50 is such that they do not completely engage in the valve closed position as seen in Fig. III but that engagement only takes place between the inner peripheral portion of the surface 48 and the surface 50 and that an annular space 58 is formed between these surfaces. This space is open to the bore 32 via the annular space 30 and the ports 28 and 34. It is also to be noted that the end surface 48 of the sleeve valve 46 adjacent the valve seat 50 and defining the space 58 is in opposition to the remote end surface 60 of the valve sleeve, which surface is also exposed to said bore and the areas of which surfaces, as presented to pressure fluid entrapped within the coupling part 10 in the valve closed position, are substantially the same. Consequently, the valve sleeve 46 will be in a state of substantial fluid pressure balance so that to open the valve sleeve 46 on connection of the body parts 10 and 12 it is only necessary to overcome the spring 52.

Turning now to the male coupling body part 12, this comprises the outer tube part 64 within which the tube extension 18 is secured to define an interior annular chamber in which a valve sleeve 66 is reciprocable, this valve sleeve being slidably mounted upon an inner tube portion of the tube extension 18 having axially spaced fluid flow ports 68 and 70. The ports 68 are defined in part by the conical valve seating surface 72 on the tube section 18, with respect to which surface 72 the outer peripheral portion only of a conical end surface 74 of the valve sleeve 66 is adapted to have seating engagement in the valve closed position as seen in Fig. III. The conicity of the surfaces 72 and 74 is such that in the valve closed position an inner annular space 76 is defined between them, which space is open to the fluid flow passage 78, as also is the remote end surface 80 of the valve sleeve via the ports 70 and an annular space 82 defined between an interiorly reduced portion of the sleeve valve and the inner sleeve portion 84 of the extension 18. This reduced valve portion defines a radial shoulder 86 against which one end of a coil spring 88 engages to constantly urge the sleeve valve 66 to closed position with respect to its valve seat 72.

It is to be noted that in the closed position of the valve 66 fluid entrapped within the coupling body part fills the space 76 as well as the space behind the end wall 80 and the shoulder 86 and that furthermore the overall area of the portion of the end wall 74 exposed to the space 76 is substantially the same as the combined areas of the end wall 80 and shoulder 86. As the result, the sleeve valve 66 is in substantial fluid pressure balance when the valve is closed so that it is only necessary to overcome the spring 88 in order to open the valve.

The sleeve valve 66 has an outwardly directed radial flange 90 positioned for axial sliding movement within an annular space 92 defined between the sleeve valve 66 and the body part 12, which annular space 92 is presented to the reduced end portion 94 on the other body part 10, upon connecting the body parts 10 and 12 together, so that the end of this portion 94 has abutting relationship with respect to the flange 90. An O ring 96 on the interior of the body part 12 maintains a fluid seal with respect to the outer surface of the sleeve valve 66. Another O ring 98 in the sleeve valve 66 maintains a fluid seal between this sleeve valve and portion 94 of the body part 10, when the body parts 10 and 12 are connected together (as seen in Fig. IV) and the valves 46 and 66 are open. In this condition of the parts, an O ring 100 on the valve seat part 18 maintains a fluid seal with respect to end portion 102 of the sleeve valve 46.

To connect the coupling body parts 10 and 12 together it is merely necessary to engage the part 18 of the body part 12 within the socket opening 16 on the other body part 10. This can be done by holding the body part 12 in one hand and the other body part 10 in the other hand, with the body part 10 being at first displaced axially to the left, from the position seen in Fig. III, against the action of the spring 38. This displacement advances the nose portion 104 of the tube 24 clear of the end of the plug 26 sufficient to permit the balls 20 to be located in the recess 22, whereupon release of axial pressure on the part 10 permits it to retract by the action of the stressed spring 38 and thereby cause the balls 20 to be held locked in position between the recess 22 and the plug 26, as seen in Fig. IV. Simultaneously with this coupling movement, the end portion 94 of the body part 10 will, by engagement in the annular space 92 and abutment against the flange 90, exert axial pressure to the left (as seen in Figs. III and IV) while at the same time the flange 56, by engagement of the extension 18 in the socket 16 and abutment thereof against the flange 54, will exert axial pressure to the right against the sleeve valve 46. These combined axial pressures will cause the sleeve valves 46 and 66 to be moved to open position against the action of their springs 52 and 88, respectively. Opening of the sleeve valve 46 places the fluid passage 32 on the body part 10 in fluid communication with the fluid passage 78 on the body part 12 via the now opened ports 68, 28 and 34 and the connecting annular chamber 30. It is again pointed out that this coupling together of the body parts 10 and 12 and opening of the valves 46 and 66, due to the fluid balanced condition of the valves, when closed, merely necessitates overcoming the valve springs 52 and 88 to open the valves and obviates the necessity of overcoming the prevailing internal fluid pressure.

The coupling connection provided by the engagement of the balls 20 in the annular recess 22 is such that the connection can be automatically broken upon the body parts 10 and 12 being subjected to a predetermined axially applied pulling apart force sufficient to displace the body part 10 with respect to its nipple part 14' and thereby remove the plug 26 from the position (as shown in Fig. IV) in which it constrains the balls to be locked in the recess 22.

It is to be noted that the O sealing rings 31 and 42 seal with respect to similar diameter cylindrical surfaces of the female coupling part 10, as also do the O sealing rings 96 and 100 seal with respect to similar diameter cylindrical surfaces of the male coupling part 12, it being appreciated that the O rings 42 and 100 seal with respect to outer surfaces whereas the rings 31 and 96 seal with respect to inner surfaces. The construction and arrangement is such, however, as to place these interior parts of the coupling assembly in substantial fluid balance, internally, when the coupling parts 10 and 12 are coupled together, whereby automatic disconnection upon the occurrence of a predetermined overload is possible of taking place.

Having thus described this invention in one practical form thereof what I claim as novel and wish to secure by Letters Patent is as follows:

A coupling for fluid conductors comprised of a pair of hollow body parts, means releasably connecting said parts, one of said body parts having an opening at one end and an annular conical valve seat surrounding said opening, a sleeve valve mounted for axial sliding movement within said one body part; the other body part having at one end a conical fixed end wall defining a valve seat, a sleeve valve mounted for sliding movement on said other body part, the end surface of each valve sleeve adjacent its respective seat being in the form of a conical annulus, each valve seat surface and the surface of the conical annulus of its corresponding valve sleeve being of different inclination, whereby only a line contact is made between said valve sleeve and valve seat and a space is defined therebetween when said valve is seated on said seat, passage means in each body part for admitting fluid to the conical annuli and the opposite ends of said valve sleeves, said surfaces of the conical annuli and said opposite ends of the valve sleeves being substantially equal in area so that the effect of fluid pressure on the valve sleeve is substantially balanced, and means on each body part contacting and moving the valve sleeve in the other part away from its respective valve seat when said body parts are coupled.

References Cited in the file of this patent

UNITED STATES PATENTS

| | | |
|---|---|---|
| 1,968,421 | Proctor | July 31, 1934 |
| 2,304,390 | Wolfram | Dec. 8, 1942 |
| 2,441,363 | Krueger | May 11, 1948 |
| 2,461,705 | Stranberg | Feb. 15, 1949 |
| 2,546,671 | LeClair | Mar. 27, 1951 |
| 2,554,390 | Stevenson | May 22, 1951 |
| 2,633,857 | MacDonald | Apr. 7, 1953 |

FOREIGN PATENTS

| | | |
|---|---|---|
| 552,435 | Great Britain | Apr. 7, 1943 |